Patented Dec. 21, 1948

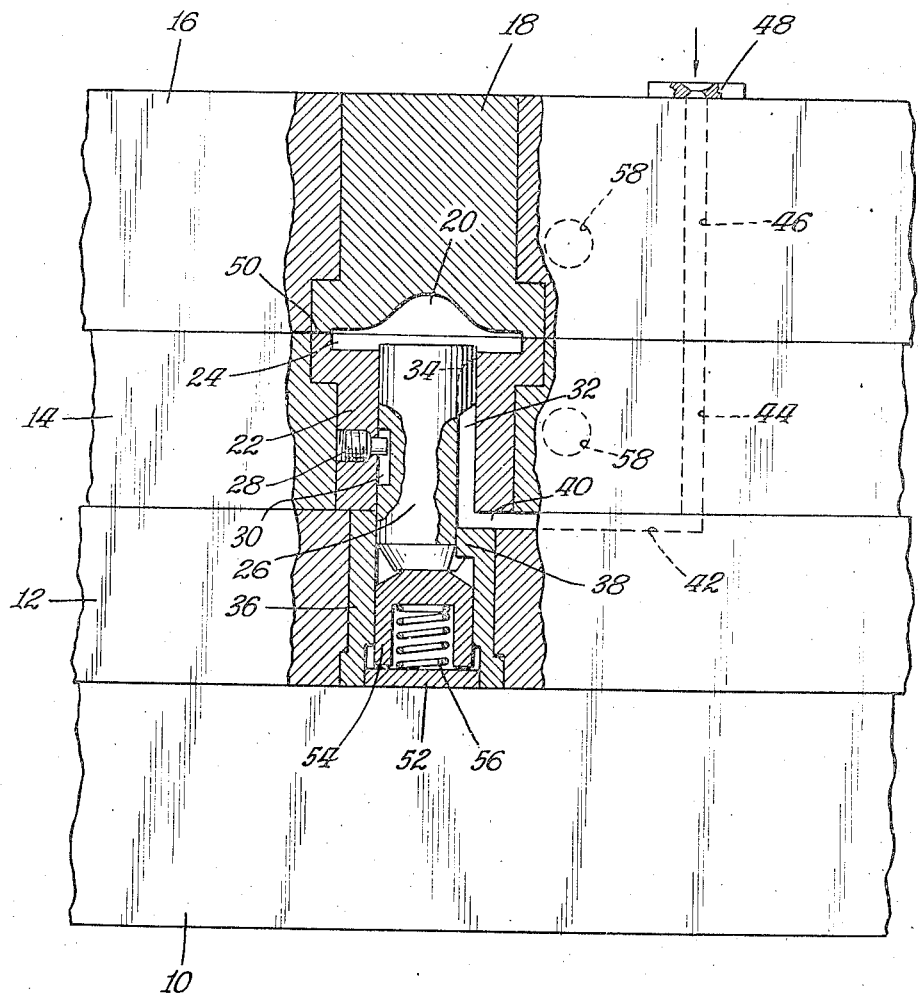

2,456,778

UNITED STATES PATENT OFFICE 2,456,778

INJECTION MOLDING OF PLASTIC MATERIAL

John E. Gilchrist, Chicago, Ill.

Application March 13, 1946, Serial No. 654,068

4 Claims. (Cl. 18—42)

My invention relates to the production of articles from plastic material and includes among its objects and advantages the substantial elimination of gates on the product.

In the accompanying drawing the figure is a vertical section, partly in elevation, of an illustrated embodiment of apparatus according to the invention.

Referring to the drawing, the base block 10 supports the inlet block 12 which supports the lower form block 14 which supports the upper form block 16. All the blocks may be clamped together in the position shown by conventional means well known in the art. The upper block 16 houses upper die 18 cut away at 20 to define part of the shape of the finished article. The lower die member 22 also defines a peripheral portion of the article to be formed at 24 and houses the slidable plug 26, the upper portion of which also defines a part of the contour of the finished article. The plug 26 is vertically slidable in the die 22 and the sliding movement may be limited, as by means of a pin 28 threaded in the die 22 and entering the cavity 30 in the plug. At another point in the periphery of the plug I machine an inlet groove 32, the upper end of which is terminated by an arcuate wall at 34 which is below the top of the plug. The inlet block 12 houses the guide sleeve 36 which is in axial alignment with the dies 18 and 22. The sleeve 36 has a lug 38 projecting radially inward and fitting snugly in the groove 32. Just above the lug the sleeve is notched as indicated at 40 to define an inlet passage.

Conventional means may be employed for delivering uncured plastic material under pressure to the inlet 40. I have illustrated a passage 42 in the upper face of the block 12, closed by the overlying block 14, which passage may receive raw plastic under pressure through riser 44 in the block 14 and a riser 46 in the block 16 connected with a conventional receiving bushing 48.

When the cavity defining the finished article is filled with plastic, air escapes along the contact surface between the blocks 14 and 16. If necessary in large sizes, a tiny line can be scribed at 50 to make sure that there will be adequate air leakage during filling.

When the raw plastic enters the inlet 40 at some such pressure as 20,000 pounds per square inch, the pressure in the groove 32 will press on the upper end of the groove at 34 and lift the plug until the groove 32 communicates with the space defining the article to be molded. The plug will remain in this condition while plastic material flows in until the cavity has been completely filled and pressure develops in the cavity itself. Since the area of the top of the plug is many times that of the groove 32, as soon as a relatively low pressure has been built up in the article itself, the plug will be forced down again toward the position shown in the drawings, and the entrance passage will thus be cut off.

Thereafter the desired temperature of the molds will produce a finished article which can be removed from the separated molds and will have no gate or point of surface irregularity at the place where the plastic entered the mold.

By proportioning the sizes of the plug and the groove 32, it is possible to secure any desired working ratio between the injection pressure and the hydraulic pressure in the body of the article itself before curing. I have also indicated a plate 52 supporting a cap 54 slidable in the sleeve 36, and a compression spring 56 pressing the cap 54 upward. With a plug of given design a considerable variation of the pressure ratio may be achieved by varying the strength of the spring 56.

Conventional means may be employed for heating and/or cooling the molds. I have indicated passageways 58 in the blocks 14 and 16 for receiving suitable heat transfer mediums. In the case of thermo-plastic material, the plastic comes in hot and passages 58 are used for cooling only. With thermo-setting material the plastic comes in at temperatures below those at which the material hardens, and passages 58 are available to receive hot fluids for raising the temperature, and later cooling fluids also, if desired.

Without further elaboration the foregoing will so fully explain my invention that others may readily adapt the same for use under various conditions of service. As at present advised with respect to the apparent scope of my invention, I desire to claim as my invention the subject matter of the following claims and equivalents thereof.

I claim:

1. Equipment for forming molded articles without gates which comprises: mold means defining a cavity having the configuration of a finished article; said mold means including a slidable plug member; said plug member having a passage opening into said cavity upon movement of said plug member into said cavity, and means for closing said opening on movement of said plug member out of said cavity; the area of said plug member exposed to the pressure in said cavity being greater than the area of said valve passage; means for delivering plastic material under pressure to said valve passage; resilient biasing means for holding said plug projected into said cavity with said valve passage open; and means for heating and cooling said molds.

2. Equipment for forming molded articles without gates, comprising, in combination: a mold; a plunger slidable into and out of said mold; resilient means biasing said plunger inwardly; said plunger having a passageway which, when said plunger is in its inner position, opens into said mold; said mold having a portion in sliding contact with said plunger, which portion closes said passageway when said plunger moves outwardly from its innermost position; and means for delivering molding material to said passageway under pressure; whereby said plunger will be actuated by the pressure in said mold to move outwardly and cut off said passageway at a predetermined maximum pressure determined by the tension of said resilient means.

3. Equipment for forming molded articles without gates, comprising, in combination: a mold element; a plunger element slidable into and out of said mold element; resilient means biasing said plunger element inwardly; one of said elements having a passageway which, when said plunger element is in its inner position, opens into said mold; the other element having a portion in sliding contact with the element having said passageway, which portion closes said passageway when said plunger element moves outwardly from its innermost position; and means for delivering molding material to said passageway under pressure; whereby said plunger element will be actuated by the pressure in said mold element to move outwardly and cut off said passageway at a predetermined maximum pressure determined by the tension of said resilient means.

4. Equipment for forming molded articles without gates, comprising, in combination: a mold; a plunger slidable into and out of said mold; means biasing said plunger inwardly; said plunger having a passageway which, when said plunger is in its inner position, opens into said mold; said mold having a portion in sliding contact with said plunger, which portion closes said passageway when said plunger moves outwardly from its innermost position; and means for delivering molding material to said passageway under pressure; whereby said plunger will be actuated by the pressure in said mold to move outwardly and cut off said passageway at a predetermined maximum pressure determined by the force of said biasing means.

JOHN E. GILCHRIST.

REFERENCES CITED

The following references are of record in the file of this patent:

UNITED STATES PATENTS

| Number | Name | Date |
|---|---|---|
| 937,477 | Shonberg | Oct. 19, 1909 |
| 969,539 | Kitchen | Sept. 6, 1910 |
| 1,347,728 | Wills | July 27, 1920 |
| 2,090,489 | Sommerfeld | Aug. 17, 1937 |
| 2,378,586 | Schultz | June 19, 1945 |

OTHER REFERENCES

Felton, Improved Design for Injection Molds. Modern Plastic, May 1941, pages 77 and 102, copy in Class 18—I. M. Dig.